(12) United States Patent
Jaycox et al.

(10) Patent No.: US 6,432,483 B1
(45) Date of Patent: Aug. 13, 2002

(54) POLYACRYLICS CONTAINING PENDANT ACETOACETONATE MOIETIES

(75) Inventors: Gary Delmar Jaycox, West Chester, PA (US); Patricia Mary Ellen Sormani, Newark; Marko Strukelj, Wilmington, both of DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/674,742

(22) PCT Filed: May 19, 1999

(86) PCT No.: PCT/US99/11039

§ 371 (c)(1),
(2), (4) Date: Nov. 2, 2000

(87) PCT Pub. No.: WO99/60065

PCT Pub. Date: Nov. 25, 1999

Related U.S. Application Data

(60) Provisional application No. 60/085,933, filed on May 19, 1998, and provisional application No. 60/087,461, filed on Jun. 1, 1998.

(51) Int. Cl.[7] ................................................. B05D 3/02
(52) U.S. Cl. ..................................... 427/385.5; 525/185
(58) Field of Search ........................ 427/385.5; 525/185

(56) References Cited

U.S. PATENT DOCUMENTS

| | | |
|---|---|---|
| 4,772,680 A | 9/1988 | Noomen et al. |
| 5,202,375 A | 4/1993 | Biale |
| 5,288,802 A | 2/1994 | Walters et al. |
| 5,288,804 A | 2/1994 | Kim et al. |
| 5,332,785 A | 7/1994 | Brindoepke |
| 5,488,122 A | 1/1996 | Jackson |
| 5,502,189 A | 3/1996 | Slongo et al. |
| 5,524,464 A | 6/1996 | Asada et al. |
| 5,536,784 A | 7/1996 | Mao et al. |
| 5,567,761 A | 10/1996 | Song |
| 5,574,162 A | 11/1996 | Galbo et al. |
| 5,589,529 A | 12/1996 | Reinehr et al. |
| 5,591,850 A | 1/1997 | Birbaum et al. |
| 5,597,854 A | 1/1997 | Birbaum et al. |
| 5,609,965 A | 3/1997 | Esser |
| 5,622,777 A | 4/1997 | Dempsey |
| 5,633,341 A | 5/1997 | Abend |
| 5,668,198 A | 9/1997 | Suhadolnik et al. |
| 5,668,199 A | 9/1997 | Suhadolnik et al. |
| 5,668,200 A | 9/1997 | Valet et al. |
| 5,668,211 A | 9/1997 | Dormish |
| 5,672,379 A | 9/1997 | Schall et al. |
| 5,677,379 A | 10/1997 | Becker et al. |
| 5,684,094 A | 11/1997 | Susuki et al. |
| 5,686,233 A | 11/1997 | Valet et al. |
| 5,688,995 A | 11/1997 | Luther et al. |
| 5,712,363 A | 1/1998 | Noomen et al. |
| 5,718,817 A | 2/1998 | Bossert et al. |

FOREIGN PATENT DOCUMENTS

| | | | |
|---|---|---|---|
| JP | 02-047171 A2 | * | 2/1990 |
| JP | 06-025411 A2 | * | 2/1994 |
| RU | 2039773 C | | 4/1996 |
| WO | WO 97/43325 | | 11/1997 |

OTHER PUBLICATIONS

Zabel et al, Proc. –Int. Conf. Org. Coat.: Waterborne, High Solids, Powder Coat., 23rd, pp. 485–503, 1997.* van Beelen et al., Aviox CF Primer: A New Generation Primer for Aircraft Maintenance, Anti–Corrosion Methods and Materials, vol. 44, No. 2, 1997, pp. 123–128.

* cited by examiner

*Primary Examiner*—Erma Cameron
(74) *Attorney, Agent, or Firm*—Sudhir G. Deshmukh

(57) ABSTRACT

A liquid coating composition curable at ambient temperature comprising a polyacetoacetate-containing component and a polyamine component, the former comprising bulky pendant moieties that contribute to rapid cure and robust films of good early hardness.

17 Claims, No Drawings

POLYACRYLICS CONTAINING PENDANT ACETOACETONATE MOIETIES

This application is a §371 of PCT/US99/11039 filed on May 19, 1999, which claims the benefit of U.S. Provisional Applications 60/085,933 filed on May 19, 1998 and 60/087,461 filed on Jun. 1, 1998.

The present invention generally relates to low VOC (volatile organic component) high solids coating compositions and more particularly to fast-drying two-component compositions suited for automotive coatings.

BACKGROUND OF THE INVENTION

The time needed before a primer-surfacer on an auto body surface can be sanded after application, without fouling the sandpaper, is becoming increasingly important since it determines how many cars can be repaired per day. It is typical for traditional two-pack (2K) non-isocyanate-based thermoset resin systems to employ polyacrylics containing pendant acetoacetate (AcAc) groups as zone component of the binder resin and an amine and/or ketimine oligomer and/or polymer as the other. However, such an approach does not provide sufficiently rapid formation of robust coatings that can be sanded easily since viscosity restrictions imposed by the Environmental Protection Agency of the United States (EPA) must be adhered to ($\leq$4.8 lbs. volatile organic content (VOC)/gallon).

Several attempts have been made to produce rapid formation of coatings. U.S. Pat. No. 4,772,680 (hereafter '680 patent) discloses polymers of average molecular weight in the range 1000 to 100,000. However, to comply with the EPA regulation above, the average molecular weight must actually be less than about 45,000, otherwise the coating composition becomes too viscous to be of practical use or has a very short pot life of less than 30 minutes. One approach to overcome this problem is to utilize coatings composition containing polymers having high. glass transition temperatures (Tgs). However, with the ever increasing restrictions on the permissible amount of the VOC that can be released in the atmosphere and attendant molecular weight limitations, it is becoming more difficult to polymerize polymers having Tg's above 40° C. and having sufficient pendant AcAc groups (e.g., 10 to 40% by weight). Such polymers having the desired cross-link density are required to achieve good repair durability. Therefore, one cannot apply the teaching of the '680 patent for polymers with Tg's above about 40° C. and still meet the EPA restrictions. The instant invention provides for coating compositions containing high Tg polymers and it represents a significant advance over the teachings of the '680 patent.

SUMMARY OF THE INVENTION

The present invention is directed to a coating composition comprising:
 a crosslinking component comprising a polyamine, a polyketimine, or a combination thereof, wherein said polyamine has an average of at least two amine functionalities per polyamine molecule and wherein said polyketimine has an average of at least two ketimine functionalities per polyketimine molecule; and
 a binder component comprising:
 a polyacetoacetate having at least two acetoacetate functionalities, said polyacetoacetate being polymerized from a monomer mixture comprising a methacrylate monomer, a styrene monomer, or a combination thereof, said methacrylate and styrene monomers each having a bulky pendant moiety, wherein a coating from said coating composition at a two-hour cure has a Persoz hardness of about greater than or equal to 60 for a dry film thickness of greater than or equal to 40 microns.

The present invention is also directed to a method of producing a coating on a substrate, said method comprising:
 mixing a crosslinking component with a binder component to form a pot mix, said crosslinking component comprising a polyamine, a polyketimine, or a combination thereof, said polyamine having an average of at least two amine functionalities per polyamine molecule and said polyketimine having an average of at least two ketimine functionalities per polyketimine molecule; said binder component comprising a polyacetoacetate having at least two acetoacetate functionalities, said polyacetoacetate being polymerized from a monomer mixture comprising a methacrylate monomer, a styrene monomer, or a combination thereof, said methacrylate and styrene monomers each having a bulky pendant moiety;
 applying a layer of said pot mix on said surface; and
 curing said layer under ambient conditions to form said coating on said surface of said substrate, said coating at a two-hour cure has a Persoz hardness of about greater than or equal to 60 for a dry film thickness of greater than or equal to 40 microns.

One of the advantages of the present invention is its low VOC, which is significantly below the current guidelines of the EPA.

Another advantage of the composition of the present invention is that it is free from isocyanate groups. As a result, it has less toxicity than conventional polyurethane coatings prepared from isocyanate group-containing compounds. This reduced toxicity is particularly helpful for auto paint repair shops that may not have physical facilities required to handle more toxic compositions containing isocyanate functionalities.

Yet another advantage of the composition of the present invention is that it reduces the time-to-sand, before the coating can be sanded without fouling the sandpaper, thereby increasing the number of repairs that could be performed in a day.

Still another advantage of the composition of the present invention is that it does not release pungent odors often associated with low molecular weight compounds containing acrylate functional moieties. Compounds such as these are employed in some of the conventional low VOC non-isocyanate containing coating compositions.

DETAILS OF THE INVENTION

As defined herein:

"Two-pack coating composition" means a thermosetting composition comprising two components that are stored in separate containers, which are typically sealed for increasing the shelf life of the components of the coating composition. The components are mixed just prior to use to form a pot mix, which has a limited pot life, typically a few minutes, such as 15 minutes to 45 minutes to a few hours, such as 2 hours to 6 hours. The pot mix is applied as a layer of desired thickness on a substrate surface, such as an autobody. After application. the layer dries and cures to form a coating on the substrate surface having desired coating properties, such as solvent resistance.

"Low VOC coating composition" means a coating composition that is less than about 0.6 kilogram of organic solvent per liter (4.8 pounds per gallon) of the composition, as determined under the procedure provided in ASTM D3960.

"High solids composition" means a coating composition having a solids component of above 20 percent, preferably in the range of from 25 to 95 percent and more preferably in the range of from 30 to 80 percent, all in weight percentages based on the total weight of the composition.

"GPC weight average molecular weight" means a weight average molecular weight measured by utilizing gel permeation chromatography. A high performance liquid chromatograph (HPLC) supplied by Hewlett-Packard, Palo Alto, Calif. was used. Unless stated otherwise, the liquid phase used was tetrahydrofurane and the standard was polymethyl methacrylate.

"Polydispersity" means GPC weight average molecular weight divided by GPC number average molecular weight.

"Polymer solids" or "Binder solids" means a polymer or binder in its dry state.

"Bulky pendent moiety" means a group on a polymer that restricts segmented motion of the polymer backbone.

The present invention is directed to a coating composition suited for various coating processes, particularly in automotive refinishing processes used for coating autobodies. The composition is a two-pack composition, which includes a crosslinking component and a binder component.

Typically, about a 3-hour cure time is required for conventional polyacetoacetate-ketimine binder systems, before coatings therefrom can be sanded without fouling the sandpaper. However, a need exists for a coating composition that provides for a coating that can be sanded in 1 hour or less without adversely affecting holdout [i.e., distinctness of image (DOI) and feather-edge holdout (FIE)] once it is topcoated with a base coat and a clear coat, or with a single-stage coat. One approach to achieve this end is to increase the glass transition temperature (Tg) of the polyacetoacetate. However, the amount of monomer containing the cross-linkable moiety, e.g., AcAc-functionalized monomer, must be maintained in the range of from about 10 to 80 weight percent to provide sufficient cross-linking so that holdout is not adversely affected. The foregoing weight percent range is important for avoiding lacquer-type primer-surfacer behavior with very little or no cross-linking in which the DOI and FIE holdout are poor due to solvent swelling after topcoat application. Furthermore, the molecular weight for conventional spraying will be in the range of about 5,000 to 50,000, or else the viscosity is too high to be used in a primer-surfacer formulation that adheres to current Environmental Protection Agency (EPA) restrictions (i.e., 4.8 VOC or less).

We have made an unexpected discovery that permits the use of a polyacetoacetate polymerized from sufficient amount of cross-linkable monomer (e.g., 10 to 80% of AcAc-functionalized monomer) for providing good DOI and F/E holdout, having a reasonable molecular weight (5,000 to 50,000) so that it can be readily applied by conventional spray gun, and having sufficiently high Tg (e.g., 40° to 150° C.) to provide a fast drying two pack coating composition that yields a coating that sands well (i.e., no fouling of the sandpaper occurs) at a short cure time of about an hour. We discovered that the foregoing results could be accomplished by incorporating high Tg (rigid) bulky monomers in the polyacetoacetate used in the coating composition of the present invention to provide the resulting polyacetoacetate with bulky pendent moieties. The coating from the coating composition of the present invention has a Persoz hardness of about greater than or equal to 60, preferably in the range of from 60 to 150, more preferably in the range of 70 to 120 for a dry film thickness of greater than or equal to 40 microns.

The coating composition includes in the range of from 10 percent to 90 percent, preferably in the range of from 10 percent to 70 percent and more preferably in the range of from 15 percent to 60 percent of the crosslinking component, the percentages being in weight percentages based on the total weight of binder and crosslinking components solids.

The crosslinking component includes a polyamine, a polyketimine, or a combination thereof. Polyketimine is preferred. When used as a combination of a polyamine and a polyketimine, the ratio thereof by weight parts is in the range from 1 to 100 through 100 to 1, preferably in the range of from 1 to 50 through 50 to 1, more preferably in the range of from 1 to 20 through 20 to 1.

The polyamine has a weight average molecular weight of at least 100, as determined by gel permeation chromatography using polymethyl methacrylate standards. Typically, the GPC weight average molecular weight ranges from about 100 to about 100,000, preferably from about 200 to about 50,000 and more preferably from about 300 to about 10,000.

The polyamine has an average of at least two amine functionalities per molecule, which may be primary, secondary or a combination of secondary and primary amine functionalities. Preferably, the polyamine has an average of from about 2 to about 25 and more preferably, in the range of from about 2 to about 6 amine functionalities per polyamine molecule and has 2 to 200, preferably 6 to 100 and more preferably 8 to 50 carbon atoms. These amine functionalities may be present either as pendant functionalities or amine functionalities positioned in the backbone of the polymer chain. Pendent amine functionalities are preferred.

Examples of representative polyamines suitable for use in the invention include aliphatic or cycloaliphatic amines, or a combination thereof. The aliphatic polyamine is preferred.

Examples of suitable polyamines include primary and secondary amines, such as, ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl)methylamine, 3-amino-1-(methylamino) propane, 3-amino-1-(cyclohexylamino)propane, and N-(2-hydroxyethyl)ethylene diamine. Ethylenediamine, propylenediamine, butylenediamine and 1,2-diaminocyclohexane are preferred.

Other suitable polyamines include those of the formula:

where the $R_1$ and $R_2$ groups may be the same or different and represent an alkylene group containing 2 to 6 and preferably 2 to 4 carbon atoms and n is an independently selected number in the range of from 1 to 6 and preferably in the range of from 1 to 3. The alkylene group is a cycloalkylene group or an alkylene group containing an ether-oxygen atom. Examples of representative polyamines containing polyalkylene groups include diethylene triamine, dipropylene triamine and dibutylene triamine. It is preferred that these polyamines should be of a cycloaliphatic nature and contain 5 to 15 carbon atoms. such as isophoronediamine; more particularly containing an alpha-aklyl group, such as bis(3-methyl-4-aminocyclohexyl) methane and bis(3-methyl4-aminocyclohexyl)propane.

Other suitable polyamines include reaction products of primary or secondary polyamines, such as ethylene diamine, diethylene triamine and isophorone diamine, with polyfunctional epoxy, isocyanate, maleinate, fumarate, acryloyl, methacryloyl, or a combination thereof.

Some of the suitable polyepoxides include those containing at least two oxirane groups in the molecule, i.e.,

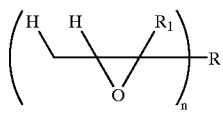

where n is at least two, $R_1$ is hydrogen or methyl, and $R_2$ broadly represents an organic based molecule or polymer typically composed of carbon, hydrogen, oxygen, and optionally nitrogen, sulfur, or both. Hydroxyl substituent groups may also be present, as well as halogen and ether groups. Generally, the epoxide equivalent weight ranges from about 100 to about 1500, preferably from about 100 to about 1200, and more preferably from about 150 to about 600. These polyepoxides can be broadly categorized as being aliphatic, aromatic, cyclic, acyclic, alicyclic or heterocyclic.

Another group of useful polyepoxides for use in the present invention includes epoxy novalac resins. These resins are prepared by reacting an epihalohydrin with the condensation product of an aldehyde with a monohydric or polyhydric phenol. One example is the reaction product of epichlorohydrin with a phenolformaldehyde condensate.

Another particularly preferred group of the polyepoxides are the polyglycidyl ethers of polyhydric aromatic hydroxy compounds, such as for example, dihydric phenols. The phenol must be at least dihydric, such as, for example, resorcinol, catechol, hydroquinone, bis(4-hydroxyphenyl)-1,1-isobutane; 4,4-dihydroxybenzophenone; bis(4-hydroxyphenyl)1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Preferably bisphenol A is utilized. Of the many polyepoxides possible, the one principally utilized is epichlorohydrin although epibromhydrin is also quite useful. The polyglycidyl ethers especially useful herein are obtained by reacting epichlorohydrin and bisphenol A in the presence of an alkali, such as sodium or potassium hydroxide. The series of epoxy resins sold by Shell Chemical Company under the trademark EPON are especially useful herein.

Another group of useful polyepoxides are the polyglycidyl ethers derived from reacting epihalohydrin, preferably epichlorohydrin, with polyhydric alcohols, such as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the polyepoxides which are polyglycidyl ethers of polycarboxylic acids. These materials are produced by the reaction of an epoxy compound, such as epichlorohydrin with an aliphatic or aromatic polycarboxylic acid such as oxalic acid; succinic acid; glutaric acid; terephthalic acid; 2,6-naphthalene dicarboxylic acid and dimerized linoleic acid.

Still another group of polyepoxides are derived from epoxidation of olefinically unsaturated alicyclic materials. Among these are the epoxy alicyclic ethers and esters, which are well known in the art.

It should be understood that mixtures of the polyepoxides are also useful herein. The preferred epoxy equivalent weight of the polyepoxide(s) is in the range of from 87 to 6000, more particularly the range of from 120 to 1000. suitable polyoxides include those containing oxyalkylene groups, i.e.,

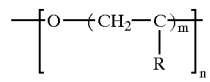

wherein R is hydrogen or $C_1$ to $C_6$ alkyl, m is an integer varying from 1 to 4 and n is an integer varying from 2 to 50. The proportion of oxyalkylene groups in the polyepoxide depends upon a number of factors, among them the size of the oxyalkylene group and the nature of the polyepoxide.

Examples of suitable polyisocyanates include aliphatic, cycloaliphatic or aromatic di-, tri- or tetraisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane-4,4'-diisocyanate, a toluene diisocyanate, 1,3-bis(1-isocyanato 1-methylethyl)benzene, 1,4-bis(1-isocyanato-1-methylethyl)benzene, 1,3-bis(isocyanatomethyl)benzene a xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation ), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

Examples of suitable polyacrylates or polymethacrylates include polymerized monomers, such as acrylic or methacrylic esters of a mono-, di- or polyfunctional hydroxyl compound including methyl acrylate, methyl methacrylate, ethyl acrylate, hydroxyethyl acrylate, hydroxyethyl methacrylate, propyl acrylate, hydroxypropyl methacrylate, butyl acrylate, butyl methacrylate, hydroxyhexyl acrylate, 2-ethylhexyl acrylate, octyl acrylate, isobornyl acrylate, oleyl acrylate, glycidyl methacrylate or (meth) acryloxypropyl trimethoxysilane.

The polyketimines, which are suitable for use in the present invention, are obtained by blocking the amino groups on the aforedescribed polyamines with a blocking agent, such as a ketone having not more than 18 carbon atoms, preferably 3 to 10 carbon atoms. The polyketimine suitable for use in the coating composition of the present invention has a weight average molecular weight in the range of from 100 to 100,000.

The polyamine is preferably blocked with a ketone represented by the following formula:

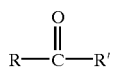

wherein R and R' are independently selected alkyl groups having between 1 and 12, preferably 1 to 8 carbon atoms. An aliphatic or cycloaliphatic ketone is preferred and an aliphatic or cycloaliphatic ketone with 3 to 8 carbon atoms is more preferred.

The polyamine suitable for use in the coating composition of the present invention includes:
I. an adduct of an amine of diglycidyl ether based on bis(4-hydroxyphenyl)-2,2-propane;
II. an adduct of an amine and dimethyl maleate; or
III. an adduct of an amine prepared from a polyacrylate having at least two acrylate groups per molecular and having a weight molecular weight from about 100 to 50,000.

Examples of suitable blocking agents for the amino groups include acetone, diethyl ketone, methylisobutyl ketone, isobutyraldehyde, hydroxybutyraldehyde, pentanone, cyclohexanone, ethylamyl ketone, hydroxycitronellal, isophorone and decanone.

The binder component of the coating composition includes in the range of from percent 1 percent to 90 percent, preferably in the range of from 5 percent to 80 percent and more preferably in the range of from 20 percent to 60 percent of at least one polyacetoacetate, the percentages being in weight percentages based on the total weight of binder solids. The polyacetoacetate has at least 2, preferably in the range of from 2 to 30, more preferably in the range of 2 to 25 and still more preferably in the range of 2 to 10 and most preferably in the range of acetoacetate groups. The polyacetoacetate has a GPC weight average molecular weight in the range of from 100 to 50,000, preferably in the range of from 200 to 40,000 and more preferably in the range of from to 1000 to 35,000. The polyacetoacetate has an acetoacetate equivalent weight (grams/equivalent) from about 100 to about 1500, preferably from about 100 to about 1000 and more preferably from about 200 to about 950. The polyacetoacetate has a Tg in the range of from 40° C. to 150° C., preferably in the range of from 50° C. to 100° C. and more preferably in the range of from 55° C. to 90° C.

The equivalent ratio of the amine in polyamine or polyketimine to polyacetoacetate is in the range of from 0.3 to 2.5, preferably in the range of from 0.5 to 2.0 and more preferably I the range from 0.6 to 1.8.

The polyacetoacetate is polymerized from a monomer mixture that includes in the range of from 5 percent to 90 percent, preferably in the range of from 10 percent to 70 percent, and more preferably in the range of from 15 percent to 60 percent of an acetoacetate-functionalized monomer. All percentages being in weight percent based on the total binder component solids weight.

The aforedescribed monomer mixture further contains in the range of from 5 percent to 90 percent, preferably in the range of from 10 percent to 70 percent, and more preferably in the range of from 15 percent to 60 percent of a methacrylate monomer, a styrene monomer, or a combination thereof, each provided with a bulky pendent moiety.

Examples of suitable methacrylate monomers having the bulky pendent moiety includes isobornyl methacrylate, cyclohexyl methacrylate, t-butylcyclohexyl methacrylate, trimethylcyclohexyl methacrylate, t-butyl methacrylate or a combination thereof.

Examples of suitable styrene monomer having the bulky pendent moiety include t-butyl styrene, more particularly para-tertiary-butylstyrene supplied by Deltech Corporation, Baton Rouge La.

The aforedescribed monomer mixture may include 5 percent to 90 percent, preferably in the range of from 10 percent to 70 percent and more preferably in the range of from 15 percent to 60 percent of an acetoacetic ester of a hydroxyalkyl (meth)acrylate or allyl alcohol monomer unit, all percentages being in weight percentages based on the total weight of the monomer mixture.

If desired the monomer mixture may contain 0.1 percent to 90 percent, preferably in the range of from 5 percent to 80 percent and more preferably in the range of from 10 percent to 70 percent of an acrylic or methacrylic ester of a mono-, di- or polyfunctional hydroxyl compound having 1 to 18, preferably 2 to 10 carbon atoms, all percentages being in weight percentages based on the total weight of the monomer mixture. Some of the examples of the acrylic or methacrylic esters include methyl acrylate, methyl methacrylate, ethyl acrylate, hydroxyethyl acrylate, hydroxyethyl methacrylate, propyl acrylate, hydroxypropyl methacrylate, butyl acrylate, butyl methacrylate, hydroxyhexyl acrylate, 2-ethylhexyl acrylate, octyl acrylate, isobornyl acrylate, oleyl acrylate, glycidyl methacrylate and (meth)acryloxypropyl trimethoxysilane.

If desired the monomer mixture may further contain 0.1 percent to 20 percent, preferably in the range of from 1 percent to 15 percent and more preferably in the range of from 1 percent to 12 percent of a monoethylenically unsaturated mono- or dicarboxylic acid having 3 to 12, preferably 3 to 10 carbon atoms or an anhydride thereof, all percentages being in weight percentages based on the total weight of the monomer mixture. Some of the examples of such acids or anhydrides thereof include acrylic acid, methacrylic acid, maleic acid, itaconic acid, maleic anhydride, cinnamic acid or dodecenic acid. Acrylic acid and maleic anhydride are preferred.

If desired the monomer mixture may contain 0.1 percent to 90 percent by weight of one or more other copolymerizable monomers, such as styrene, α-methyl styrene, vinyl toluene, acrylamide, methacrylamide, acrylonitrile, vinyl acetate, vinyl versatate, vinyl trimethoxy silane and/or allyl glycidyl ether. These monomer units are obtained for instance by acetoacetylation of an adduct of a lactone, a monoepoxy compound or a diisocyanate reacted with a diol to a hydroxyalkyl (meth)acrylate. Examples of other suitable monomer units include allyl acetacetate and acetoacetic esters of ethylenically unsaturated diols or triols such as 2-butene-1,4-diacetoacetate and (2-methylene acetoacetyl)-1-propene-3-acetoacetate.

The polyacetoacetate may be prepared in any convenient manner, for instance by polymerizing one or more acetoacetate groups-containing monomer, optionally mixed with one or more other aforedescribed monomers, at a temperature of 50° to 160° C., in the presence of 0.1–10% by weight of an initiator, calculated on the total amount of the monomer mixture. Examples of suitable initiators include free radical initiators, for instance potassium persulfate, hydrogen peroxide, cumene hydroperoxide, benzoyl peroxide, ditert-butyl peroxide, tert-butylpertrimethyl hexanoate, tert-butyl perbenzoate, azobisisobutyronitrile, azobisvaleronitrile, azobis(2,4-dimethylvaleronitrile). The polymerization is carried out in the presence of water and/or an organic solvent, such as ketone, an alcohol, an ether, an ester or a hydrocarbon. The polymerization can optionally be carried out by using UV light and in the presence of UV initiators, such as benzil, benzoin ethers and thioxanthone derivatives.

Other suitable polyacetoacetate are addition polymers having, for instance hydroxyl groups, a number of which have been converted with a reactive acetoacetate compound or a compound yielding an acetoacetate group, for instance with diketene. Examples of suitable reactive acetoacetate compounds include alkyl esters of acetylacetic acid, preferably methyl acetoacetate or ethyl acetoacetate. Suitable hydroxyl groups-containing addition polymers include copolymers of a hydroxyalkyl (meth)acrylate such as hydroxyethyl methacrylate, hydroxypropyl methacrylate and/or hydroxybutyl acrylate and optionally one or more other comonomers, and copolymers of styrene and allyl alcohol.

If desired, the binder and the crosslinking component of the coating composition may contain at least one organic solvent. Suitable examples include water, aromatic hydrocarbons, such as petroleum naphtha or xylenes; aliphatic hydrocarbons; ketones, such as methyl amyl ketone, methyl isobutyl ketone, methyl ethyl ketone or acetone; diketo compounds, such a acetyl ketone; nitroalkanes, such as nitropropane; esters, such as butyl acetate or hexyl acetate; glycol ether esters, such as propylene glycol monomethyl ether acetate; and (cyclo)aliphatic or aromatic esters of acetylacetic acid, of which the (cyclo)alkyl group or the aromatic group has 1 to 20 carbon atoms, such as ethylacetoacetate, cyclohexylacetoacetate and phenylacetoacetate. The amount of organic solvent added depends upon the desired solids level as well as the desired amount of VOC of the composition. If desired, the organic solvent may be added to both components of the binder. The amount of organic solvent used in the present invention results in the composition having a VOC of less thin 0.576 kilogram (4.8 pounds per gallon) and preferably in the range of 0.012 kilogram to 0.576 kilogram (0.1 pound to 4.8 pounds per gallon), more preferably in the range of from 0.12 kilogram to 0.42 kilogram (1.0 to 3.5 pounds per gallon), and most preferably in the range of from 0.012 kilogram to 0.252 kilogram (0.1 to 2.1 pounds per gallon) of organic solvent per liter of the composition. The solids level of the coating of the present invention varies in the range of from 5 percent to 100 percent, preferably in the range of from 10 percent to 95 percent and more, preferably in the range of from 25 percent to 85 percent, all percentages being based on the total weight of the coating composition.

The coating composition typically contains conventional additives, such as pigments, stabilizers, rheology control agents, flow agents, toughening agents, leveling agents, emulsifiers, anti-foaming agents, reducing agents, antioxidants, UV-stabilizers, sag control agents and catalysts such as organic carboxylic acids and fillers. Such additional additives will, of course, depend on the intended use of the coating composition. Fillers, pigments, and other additives that would adversely effect the clarity of the cured coating will not be included if the composition is intended to be used as a clear coating. The foregoing additives may be added to either the binder or crosslinking component, or both, depending upon the intended use of the coating composition. Optionally, the composition can also contain a compound, such as an acrylate (co)polymer, cellulose acetopropionate, cellulose acetobutyrate, nitrocellulose, a vinyl polymer, an epoxy resin and/or an α,β-ethylenically unsaturated group-containing compound.

The coating composition can be applied to the substrate in any suitable manner, such as by roller coating, spraying, brushing, sprinkling, flow-coating or dipping. It is preferred that the composition be applied by spraying or roller coating.

In use, the binder and crosslinking components of the coating composition are mixed just prior to use or about 5 to 30 minutes before use to form a pot mix, which has limited pot life, in the range of from 10 minutes to 60 minutes, before it becomes too viscous to permit application through conventional application systems, such as spraying. A layer of the pot mix is typically applied to a substrate by conventional techniques, such as spraying, electrostatic spraying, roller coating, dipping or brushing. The layer of the coating composition then cures under ambient conditions in the range of 10 minutes to 3 hours, preferably in the range of 30 minutes to 60 minutes to form a coating on the substrate having the desired coating properties. It is understood that the actual curing time depends upon the thickness of the applied layer and in the presence or absence of any suitable drying devices, such as fans that assist in continuously flowing air over the coated substrate to accelerate the cure rate. Generally, a layer having a thickness in the range of from 25 microns to 300 microns applied over a metal substrate, such as automotive body, cures in 30 to 60 minutes under ambient conditions and in the absence of any suitable drying devices. If desired, baking the coated substrate at a temperature of about 60° C. to 120° C. for about 10 minutes to 40 minutes may further accelerate the cure rate. The foregoing baking step is particularly useful under OEM (Original Equipment Manufacture) conditions. Suitable substrates include those of pretreated or non-pretreated metals, wood, synthetic materials, paper or leather. Suitable metals include iron, steel and aluminum.

Testing Procedures

Measurement of Sandability

To correlate one hour primer-surfacer sanding behavior without fouling the s and paper, we compared the primer-surfacer hardness and sanding behavior to the Persoz hardness measurements (number of pendulum oscillations before the machine stops counting) by utilizing only the crosslinking and binder components of the coating composition. The hardness of the coating was measured with respect to time by using a Persoz Hardness Test (Under ASTM D4366 Test) by using a Persoz Hardness Tester Model No. 5854 supplied by Byk-Mallinckrodt, Wallingford, Conn. It was determined that to obtain good 1 hour sandability in the body shop, the Persoz instrument had to provide values of about ≧70 oscillations, 2 hours after layer deposition onto steel panels via doctor blade, where the resulting dry film thickness was greater than or equal to 40 microns.

Comparative Coatings 1 to 4 were prepared by reacting polyketimines 3 and 6, shown below, with Comparative Polyacetoacetate (described below) and Coatings 1 to 4 were prepared by reacting polyketimines 3 and 6, shown below, with Polyacetoacetate of the present invention (described below). Persoz hardness values at 2 hours were then determined and are presented in Tables 1 and 2, below.

Polyketimines

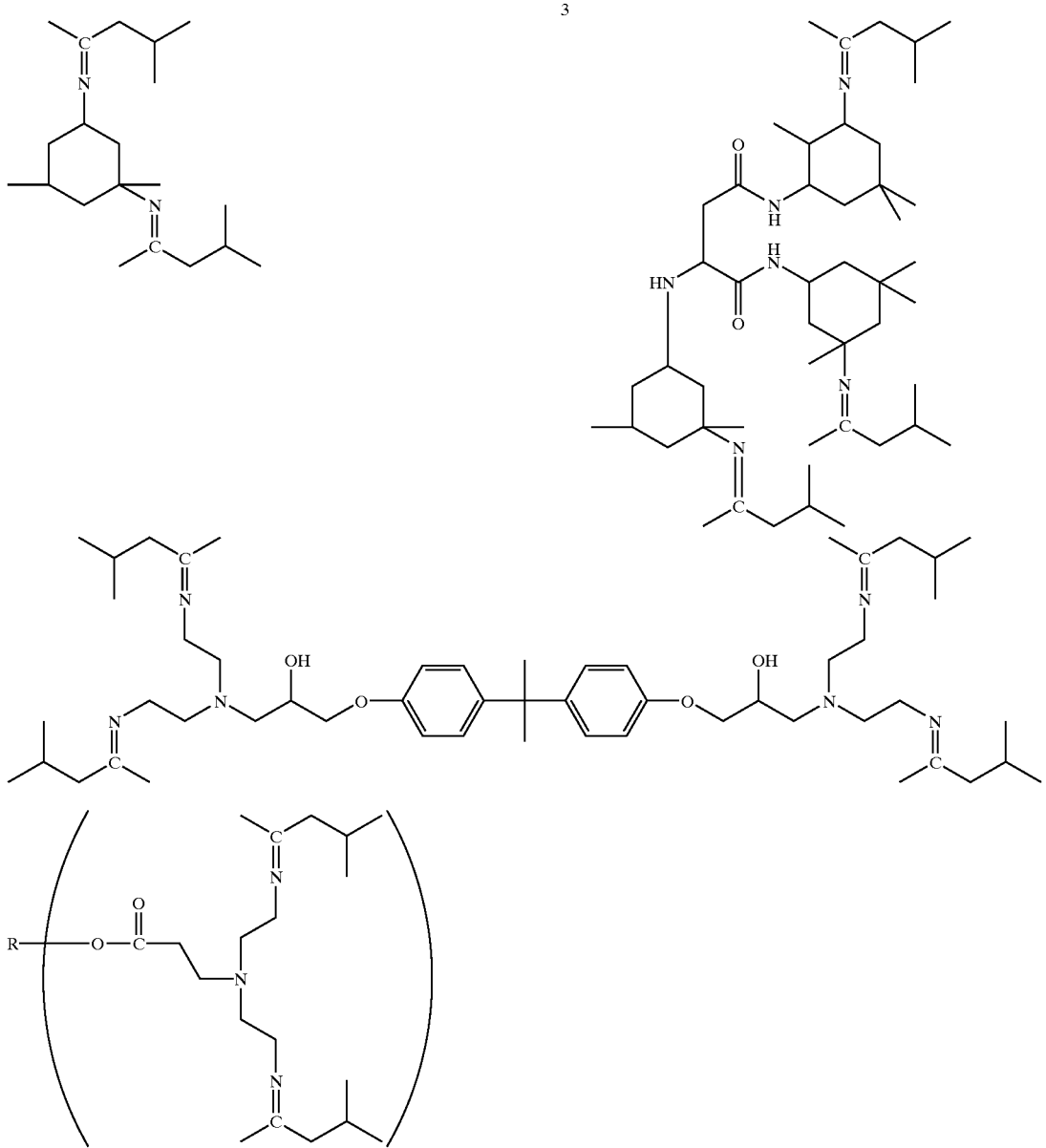

COMPARATIVE POLYACETOACETATE

To a reactor, 25.04 parts of xylene were charged and heated to boiling (about 140° C.) under nitrogen atmosphere. Subsequently, a mixture of 14.91 parts of styrene, 7.46 parts of methyl methacrylate, 10.93 parts of acetoacetoxyethyl methacrylate, 12.42 parts of n-butyl acrylate, 3.98 parts of hydroxyethyl acrylate, and 12.9 parts of xylene were concurrently added over a period of 120 minutes with a mixture of 0.620 parts of t-butylperoxy acetate (75% in mineral spirits), 0.001 parts of t-butyl peroctoate, and 8.039 parts of xylene added over 270 minutes. The reaction mixture was held an additional 60 minutes at boiling after the feeds were complete. After the hold period, 3.7 parts of xylene were added and the mixture was cooled. The resulting polymer solution had a Gardner-Holt viscosity=O; Solids=50% in xylenes; Tg=25° C. and; Mw=25,000.

POLYACETOACETATE OF THE PRESENT INVENTION

To a reactor, 24.34 parts of butyl acetate were charged and heated to boiling (about 125° C.) under nitrogen atmosphere. Subsequently, a mixture of 23.87 parts of methyl methacrylate, 17.90 parts of isobornyl methacrylate, 4.77 parts of hydroxyethyl acrylate, 13.13 parts of acetoacetoxyethyl methacrylate, and 3.3 parts of butyl acetate were added over a period of 180 minutes. At the same time, 83% of a mixture of t-butylperoxy acetate (75% in mineral spirits) and 7.52 parts butyl acetate were added over 240 minutes. The reaction mixture was held an additional 60 minutes at boiling after the feeds were complete. After the hold, the remaining 17% of the t-butylperoxy acetate/butyl acetate mixture was added over a period of 30 minutes. The reaction mixture was held an additional 30 minutes at boiling after the feed was complete. After the hold period, 3.52 parts of butyl acetate were added and the mixture was cooled. The resulting polymer solution had a Gardner-Holt viscosity S; Solids=50% in butyl acetate; Tg=70° C.; Mw=25,000. The composition contains 30% IBOMA and 20% AAEM by weight.

Comparative Coating 1

A pot mix was prepared by successively mixing 44.4 parts of Comparative Polyacetoacetate, 4.95 parts of diketimine from isophorone diamine and methylisobutyl ketone (MIBK) (bisketimine 3), 16.3 parts of butyl acetate and 2.3 parts of methylisobutyl ketone. A layer of the resulting pot mix was applied over the surface of a cold-rolled steel panel via a doctor blade to give a coating thickness of approximately 40 μm after curing.

Comparative Coating 2

A pot mix was prepared by successively mixing 44.4 parts of Comparative Polyacetoacetate, 10.6 parts of trisketimine prepared from 1 mol of dimethylmaleate, 3 moles of isophorone diamine and 3 moles MIBK (trisketimine 4; applied as a 78% solids in MIBK) and 21 parts of butyl acetate. A layer of the resulting pot mix was applied over the surface of a cold-rolled steel panel via a doctor blade to give a coating thickness of approximately 40 μm after curing Comparative Coating 3

A pot mix was prepared by successively mixing 44.4 parts of Comparative Polyacetoacetate, 12.8 parts of tetraketimine prepared by 1 mol of the diglycidyl ether of Bisphenol A and 2 mols of the bisketimine of diethylene triamine (tetraketimine 5; applied as a 55% solids solution), 13.6 parts of butyl acetate and 2.3 parts of MIBK. A layer of the resulting pot mix was applied over the surface of a cold-rolled steel panel via a doctor blade to give a coating thickness of approximately 40 Em after curing.

Comparative Coating 4

A pot mix was prepared by successively mixing 44.4 parts of Comparative Polyacetoacetate, 8 parts of tetraketimine prepared from 1 mol of a 1,6 hexanediol diacrylate and 2 moles of the bisketimine of diethylene triamine (tetraketimine 6; 70% solids in MIBK) and 17 parts of butyl acetate. A layer of the resulting pot mix was applied over the surface of a cold-rolled steel panel via a doctor blade to give a coating thickness of approximately 40 μm after curing.

Coating 1 of the Present Invention

A pot mix was prepared by successively mixing 44.4 parts of Polyacetoacetate of the present invention, 4.81 parts of diketimine from isophorone diamine and methylisobutyl ketone (MIBK) (bisketimine 3), 14.5 parts of xylene and 2.3 parts of methylisobutyl ketone. A layer of the resulting pot mix was applied over the surface of a cold-rolled steel panel via a doctor blade to give a coating thickness of approximately 40 μm after curing.

Coating 2 of the Present Invention

A pot mix was prepared by successively mixing 44.4 parts of Polyacetoacetate of the present invention, 10.3 parts of trisketimine prepared from 1 mol of dimethylmaleate, 3 moles of isophorone diamine and 3 moles of MIBK (trisketimine 4; applied as a 78% solids in MIBK) and 19.1 parts of xylene. A layer of the resulting pot mix was applied over the surface of a cold-rolled steel panel via a doctor blade to give a coating thickness of approximately 40 μm after curing.

Coating 3 of the Present Invention

A pot mix was prepared by successively mixing 44.4 parts of Polyacetoacetate of the present invention, 12.5 parts of tetraketimine prepared from 1 mol of the diglycidyl ether of Bisphenol A and 2 moles of the bisketimine of diethylene triamine (tetraketimine 5; applied as a 55% solids solution), 12 parts of xylene and 2.3 parts of MIBK. A layer of the resulting pot mix was applied over the surface of a cold-rolled steel panel via a doctor blade to give a coating thickness of approximately 40 μm after curing.

Coating 4 of the Present Invention

A pot mix was prepared by successively mixing 44.4 parts of Polyacetoacetate of the present invention, 7.8 parts of tetraketimine prepared from 1 mol of a 1,6 hexanediol diacrylate and 2 moles of the bisketimine of diethylene triamine (tetraketimine 6; 70% solids in MIBK) and 15.2 parts of xylene. A layer of the resulting pot mix was applied over the surface of a cold-rolled steel panel via a doctor blade to give a coating thickness of approximately 40 μm after curing.

TABLE 1

| Material | Persoz | Comparative Coating 1 Ketimine 3 | Comparative Coating 2 Ketimine 4 | Comparative Coating 3 Ketimine 5 | Comparative Coating 4 Ketimine 6 |
| --- | --- | --- | --- | --- | --- |
| PolyAcAc 1* Zahn (s) | T = 2 h | 22 | 30 | 34 | 29 |
| T = 0 | | 25 | 27 | 31 | 26 |
| 30 min. | | 27 | 30 | — | — |
| 60 min. | | 31 | 36 | gel | gel |
| Solids | | 40% | 40% | 40% | 40% |

*PolyAcAc 1 (Comparative Polyacetoacetate Tg = 25° C.; Mw = 25,000)

TABLE 2

| Material | Persoz | Coating 1 Ketimine 3 | Coating 2 Ketimine 4 | Coating 3 Ketimine 5 | Coating 4 Ketimine 6 |
| --- | --- | --- | --- | --- | --- |
| PolyAcAc 2* Zahn (s) | T = 2 h | 88 | 114 | 103 | 84 |
| T = 0 | | 26 | 27 | 31 | 27 |
| 30 min. | | 27 | 28 | — | — |
| 60 min. | | 30 | 32 | 123 | 65 |
| Solids | | 40% | 40% | 40% | 40% |

*PolyAcAc 2 (Polyacetoacetate of the present invention-Tg = 70° C.; Mw = 25,000)

In all cases, PolyAcAc 2 provides higher Persoz values than does 1. Furthermore, the values for PolyAcAc 2 show only a small dependence on the amount of functionality of ketimine indicating the importance of the Tg of polyacetoacetate on the surface hardness and sandability of the resultant coating.

What is claimed is:

1. A coating composition comprising:
   a crosslinking component comprising a polyketimine having an average of at least two ketimine functionalities per polyketimine molecule; and a binder component comprising:
a polyacetoacetate with a Tg in the range of from 40° C. to 150° C. and having at least two acetoacetate functionalities, said polyacetoacetate being polymerized from a monomer mixture comprising a methacrylate monomer, a styrene monomer, or a combination thereof, said methacrylate and styrene monomers each having a bulky pendant moiety, wherein a coating from said coating composition at a two-hour cure has a Persoz hardness of about greater than or equal to 60 for a dry film thickness of greater than or equal to 40 microns.

2. A coating composition comprising:
a crosslinking component comprising a polyamine, a polyketimine, or a combination thereof, wherein said polyamine has an average of at least tow amine functionalities per polyamine molecule and wherein said polyketimine has an average of at least two ketimine functionalities per polyketimine molecule; and
a binder component comprising:
a polyacetoacetate with a Tg in the range of from 55° C. to 150° C. and having at least two acetoacetate functionalities, said polyacetoacetate being polymerized from a monomer mixture comprising a methacrylate monomer, a styrene monomer, or a combination thereof, said methacrylate and styrene monomers each having a bulky pendant moiety, wherein a coating from said coating composition at a two-hour cure has a Persoz hardness of about greater than or equal to 60 for a dry film thickness of greater than or equal to 40 microns.

3. The coating composition of claim 1 or 2 wherein said monomer mixture comprises in the range of from 5 weight percent to 90 weight percent of said methacrylate monomer, said styrene monomer, or said combination thereof, all percentages based on total weight binder component.

4. The coating composition of claim 1 or 2 wherein said monomer mixture comprises in the range of from 10 weight percent to 90 weight percent of said methacrylate monomer, said styrene monomer, or said combination thereof, all percentages based on total weight binder component.

5. The coating composition of claim 1 or 2 wherein said polyacetoacetate has a weight average molecular weight in the range of from 100 to 50,000.

6. The coating composition of claim 1 or 2 wherein said monomer mixture comprises in the range of from 5 weight percent to 90 weight percent of an acetoacetate-functionalized monomer based on the total weight of the binder component.

7. The coating composition of claim 1 or 2 wherein said monomer mixture comprises in the range of from 10 weight percent to 90 weight percent of an acetoacetate-functionalized monomer based on the total weight of the binder component.

8. The coating composition of claim 1 or 2 wherein said methacrylate monomer having the bulky pendant moiety is selected from the group consisting of isobornyl methacrylate, cyclohexyl methacrylate, t-butylcyclohexyl methacrylate, trimethylcyclohexyl methacrylate, t-butyl methacrylate, and a combination thereof.

9. The coating composition of claim 1 or 2 wherein said styrene monomer having the bulky pendent moiety is t-butyl styrene.

10. The coating composition of claim 2 wherein said polyamine has a weight average molecular weight in the range of from 100 to 100,000.

11. The coating composition of claim 1, or 2 wherein said polyamine is blocked with a ketone represented by the following formula:

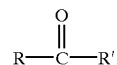

wherein R and R' are independent alkyl groups having between 1 and 12 carbon atoms.

12. The coating composition of claim 1, or 2 wherein said polyamine is:
I. an adduct of an amine of diglycidyl ether based on bis(4-hydroxyphenyl)-2,2-propane;
II. an adduct of an amine and dimethyl maleate; or
III. an adduct of an amine prepared from a polyacrylate having at least two acrylate groups per molecule and having a weight molecular weight from about 100 to 50,000.

13. The coating composition of claim 1 or 2 wherein said polyketimine has a weight average molecular weight in the range of from 100 to 100,000.

14. A method of producing a coating on a substrate, said method comprising:
mixing a crosslinking component with a binder component to form a pot mix, said crosslinking component thereof, said polyamine, a polyketimine, or a combination thereof, said polyamine having an average of at least two amine functionalities per polyamine molecule and said polyketimine having an average of at least two ketimine functionalities per polyketimine molecule; said binder component comprising a polyacetoacetate having at least two acetoacetate functionalities and having a Tg in the range of from 40° C. to 150° C., said polyacetoacetate being polymerized from a monomer mixture comprising a methacrylate monomer, a styrene monomer, or a combination thereof, said methacrylate and styrene monomers each having a bulky pendant moiety;
applying a layer of said pot mix on said surface; and said coating on said surface of said substrate, said coating at a two-hour cure has a Persoz hardness of about greater than or equal to 60 for a dry film thickness of greater than or equal to 40 microns.

15. The method of claim 14 wherein said methacrylate monomer having the bulky pendent moiety is selected from the group consisting of isobornyl methacrylate, cyclohexyl methacrylate, t-butylcyclohexyl methacrylate, trimethylcyclohexyl methacrylate, t-butyl methacrylate, and a combination thereof.

16. The method of claim 14 wherein said styrene monomer having the bulky pendent moiety is t-butyl styrene.

17. The method of claim 14 wherein said substrate is an automotive body.

* * * * *

UNITED STATES PATENT AND TRADEMARK OFFICE
CERTIFICATE OF CORRECTION

PATENT NO.    : 6,432,483 B1
DATED         : August 13, 2002
INVENTOR(S)   : Jaycox et al.

It is certified that error appears in the above-identified patent and that said Letters Patent is hereby corrected as shown below:

Column 3,
Lines 34 and 43, replace "(FIE)]" with -- (F/E)] --.

Column 15,
Line 16, replace "tow" with -- two --.

Signed and Sealed this

Eighteenth Day of February, 2003

JAMES E. ROGAN
*Director of the United States Patent and Trademark Office*